US008127757B1

(12) United States Patent
Bourgeois (10) Patent No.: US 8,127,757 B1
(45) Date of Patent: Mar. 6, 2012

(54) OUTDOOR COOKING APPARATUS (76) Inventor: Norman Bourgeois, Jefferson, LA (US)

( * ) Notice: Subject to any disclaimer, the term of this patent is extended or adjusted under 35 U.S.C. 154(b) by 145 days.

(21) Appl. No.: 11/283,065

(22) Filed: Nov. 17, 2005

Related U.S. Application Data (60) Provisional application No. 60/628,810, filed on Nov. 17, 2004.

(51) Int. Cl.
F24C 15/10 (2006.01)
A47F 3/04 (2006.01)

(52) U.S. Cl. ............ 126/25 R; 126/9 R; 126/25 A; 126/30; 126/29; 126/275 R; 99/482; 99/449

(58) Field of Classification Search .......... 126/25 R, 126/25 A, 9 R, 37 R, 21 R, 214 R, 275 R, 126/214 C; 99/340, 446, 448, 389
See application file for complete search history.

(56) References Cited

U.S. PATENT DOCUMENTS

| 1,383,043 | A | * | 6/1921 | Weaver ........................ 126/4 |
| 2,746,377 | A | * | 5/1956 | Parks ..................... 99/421 HV |
| 3,266,409 | A | | 8/1966 | Oyler |
| 3,266,478 | A | | 8/1966 | Booth |
| 3,354,876 | A | * | 11/1967 | Durham ...................... 123/382 |
| 3,354,878 | A | * | 11/1967 | Balls ........................ 126/275 R |
| 3,455,233 | A | * | 7/1969 | Cable ......................... 99/443 R |
| 3,683,791 | A | | 8/1972 | Rast, Jr. |
| 4,092,973 | A | * | 6/1978 | Bernazzani ................ 126/37 B |
| 4,362,093 | A | * | 12/1982 | Griscom ....................... 99/339 |
| 4,548,193 | A | * | 10/1985 | Marogil ......................... 126/30 |
| 4,848,312 | A | * | 7/1989 | Roy ........................... 126/37 B |
| 5,002,036 | A | | 3/1991 | Kelly |
| 5,473,979 | A | | 12/1995 | Ruben |
| 5,485,816 | A | | 1/1996 | Cox et al. |
| 6,000,389 | A | * | 12/1999 | Alpert ........................ 126/25 R |
| 6,708,604 | B1 | * | 3/2004 | Deichler, Jr. ................... 99/482 |
| 2003/0234014 | A1 | | 12/2003 | Fitzgerald |
| 2004/0123857 | A1 | | 7/2004 | Viraldo |

* cited by examiner

Primary Examiner — Steven B McAllister
Assistant Examiner — Nikhil Mashruwala
(74) Attorney, Agent, or Firm — Garvey, Smith, Nehrbass & North, L.L.C.; Charles C. Garvey, Jr.; Vanessa M. D'Souza (57) ABSTRACT An outdoor cooking apparatus is disclosed. The apparatus features a cabinet having a firebox that heats an oven interior within the cabinet. The firebox also cooks food items placed on a grill panel that is supported above the firebox with a grill support frame. The firebox and grill support frame can be removably attachable to the cabinet.

16 Claims, 7 Drawing Sheets

OUTDOOR COOKING APPARATUS

CROSS-REFERENCE TO RELATED APPLICATIONS

Priority of U.S. Provisional Patent Application Ser. No. 60/628,810, filed Nov. 17, 2004, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an improved outdoor cooking apparatus that includes an oven portion and one or more grilling portions, each heated by the same firebox. Even more particularly, the present invention relates to an outdoor cooking apparatus providing a cabinet having sides that define an interior oven, a firebox that fits the top of the cabinet, the firebox holding fuel (e.g. charcoal) for grilling food above the firebox and for radiating heat to the oven interior, wherein the grill support frame and firebox portions can optionally be removable.

2. General Background of the Invention

Outdoor cooking typically utilizes charcoal or like fuel for cooking. Some outdoor cooking devices provide ovens with an interior for slow cooking a selected food item.

BRIEF SUMMARY OF THE INVENTION

The present invention provides an improved outdoor cooking apparatus that features a cabinet having an interior for slow cooking a desired food item, a firebox that is positioned at the upper end portion of the cabinet, and a grill support frame that supports one or more grills, grilling surfaces or cooking racks for cooking food items at a position spaced above the firebox. The firebox and grill support frame can each optionally be removably attached to the cabinet.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

FIGS. 1-8 show the preferred embodiment of the apparatus of the present invention, designated generally by the numeral 10 in FIGS. 1, 2, 4, and 6. Outdoor cooking apparatus 10 provides a cabinet 11 having an interior 12. The cabinet 11 interior 12 functions as an oven for cooking items that are placed within interior 12. Food items to be cooked can be placed within interior 12 upon upper shelf 16A or lower shelf 16B.

Cabinet 11 can be wheeled, providing a plurality of wheels 13. Door 14 is moveable between closed (FIG. 1) and open (FIG. 2) positions. When in the open position, door 14 provides a pair of pivotally attached, spaced apart legs 15 that pivot to rest upon an underlying support surface, holding the door 14 in a substantially horizontal position. Door 14 supports lower shelf 16B when shelf 16B is pulled away from cabinet 11 to the position shown in FIG. 2. Thus, the door 14 and legs 15 help support a large food item such as a turkey, pig or the like after it has finished cooking and is to be removed by pulling the lower shelf 16A to the position of FIG. 2. Door 14 can be equipped with one or more thermometers for displaying temperature of interior 12. Door 14 can have one or more vent openings or dampers.

Figure 1:
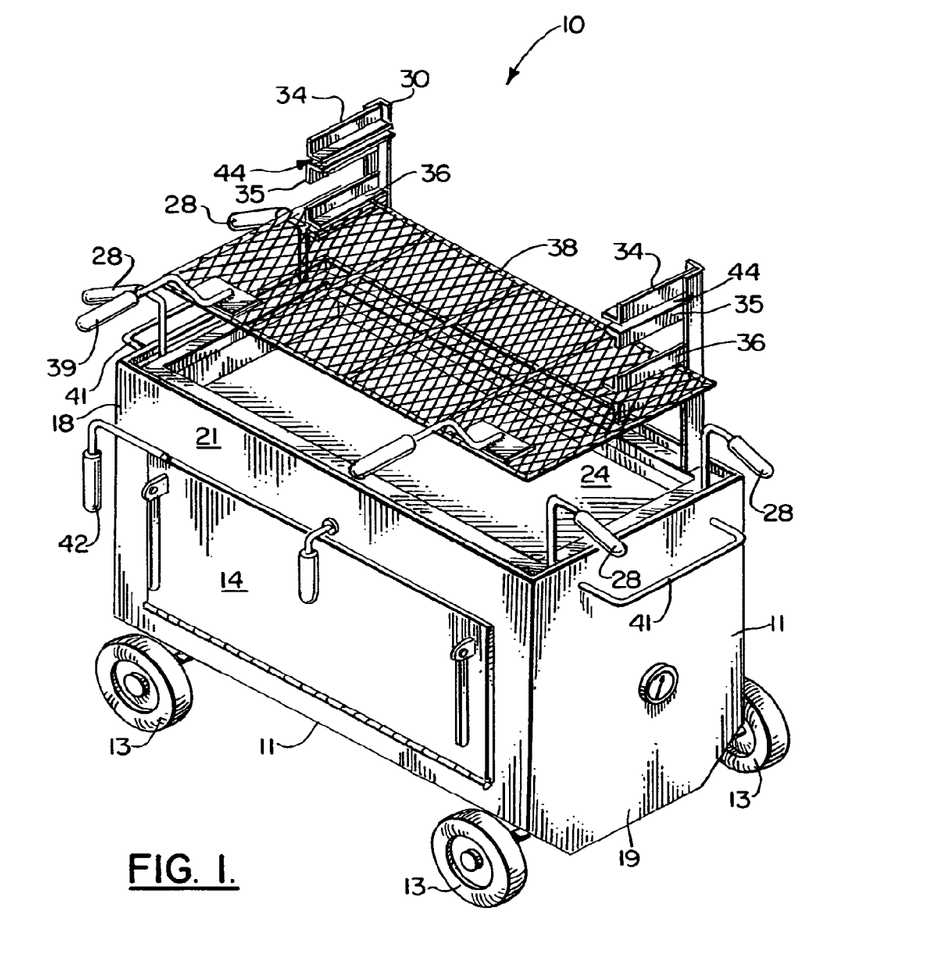
FIG. 1 is a front perspective view of the preferred embodiment of the apparatus of the present invention.
Figure 2:
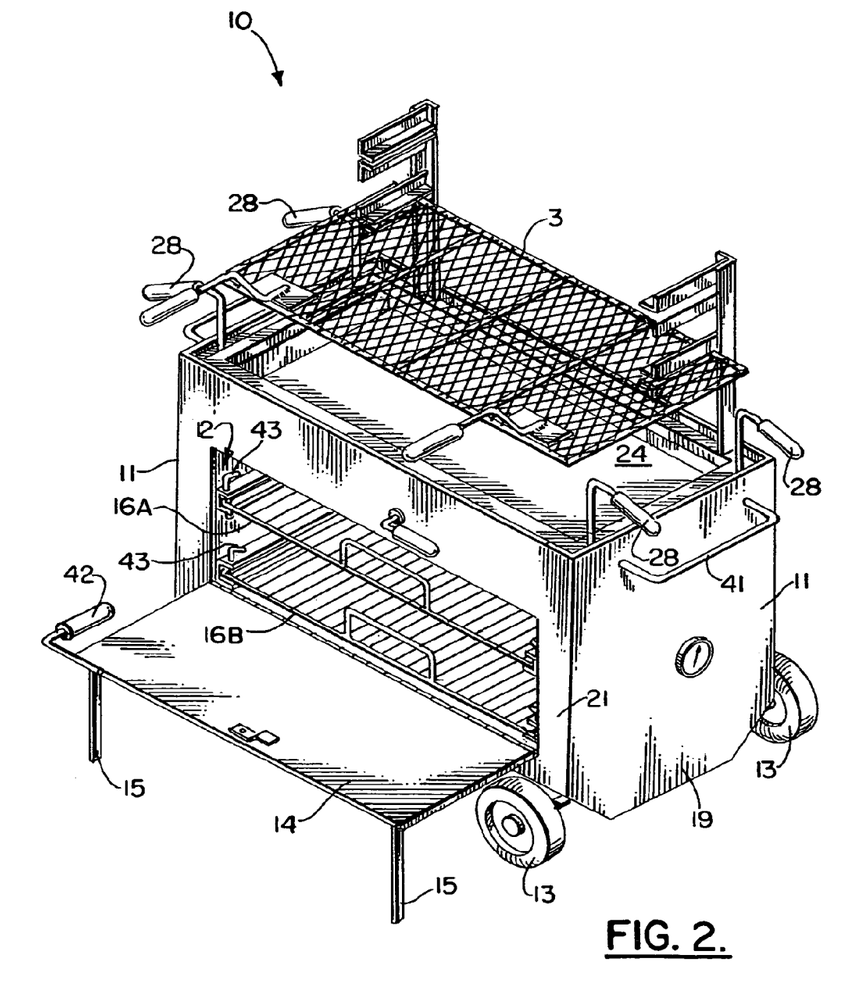
FIG. 2 is a front perspective view of the preferred embodiment of the apparatus of the present invention with the door in an open position.
Figure 3:
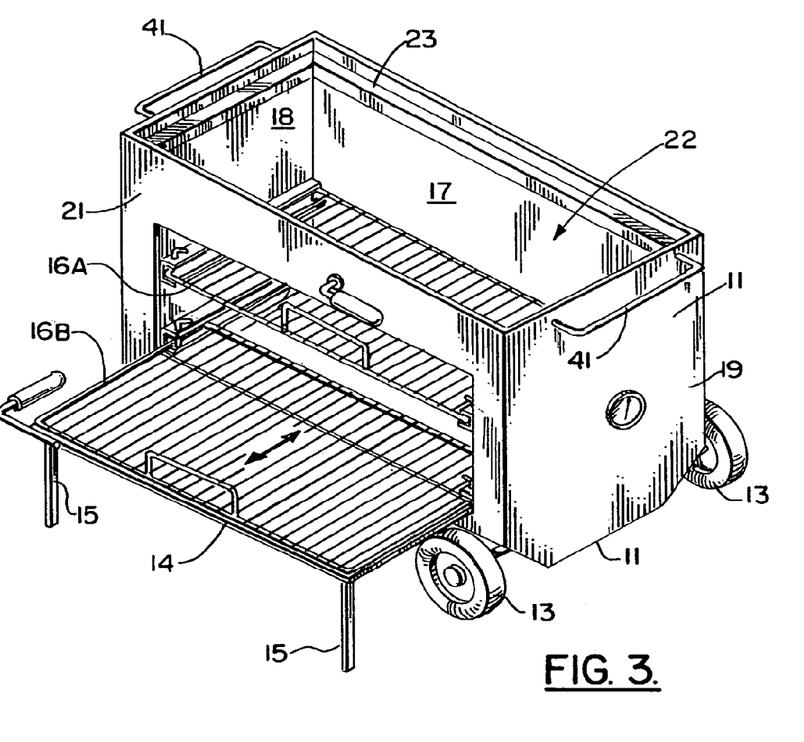
FIG. 3 is a partial perspective view of the preferred embodiment of the apparatus of the present invention showing the cabinet with firebox and grill support frame removed.
Figure 4:
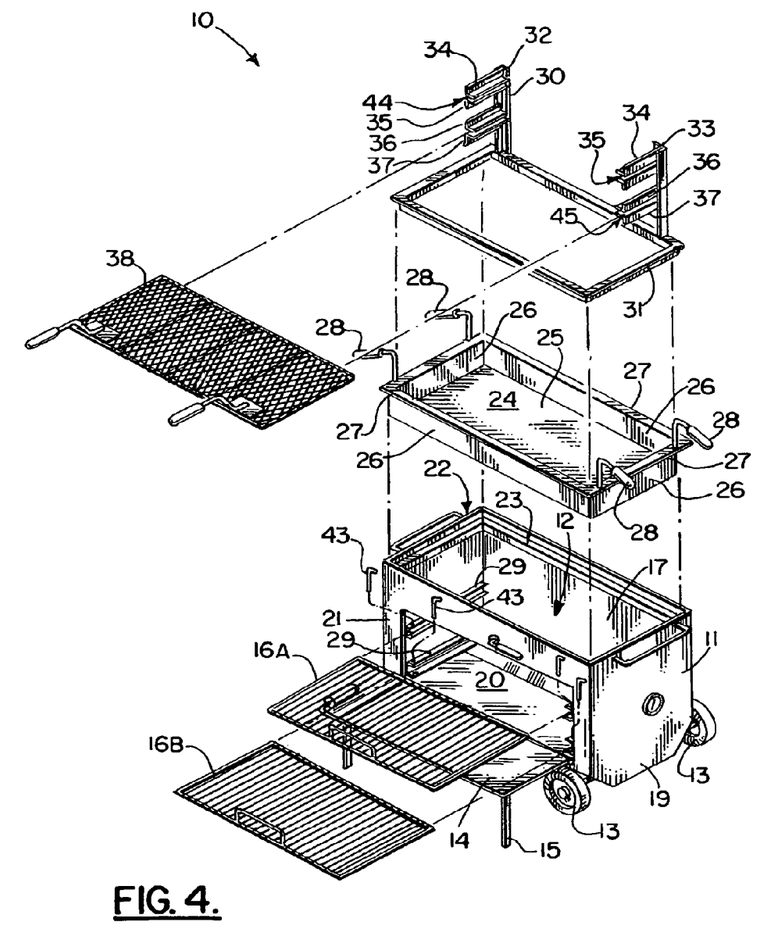
FIG. 4 is a perspective view of the preferred embodiment of the apparatus of the present invention.
Figure 5:
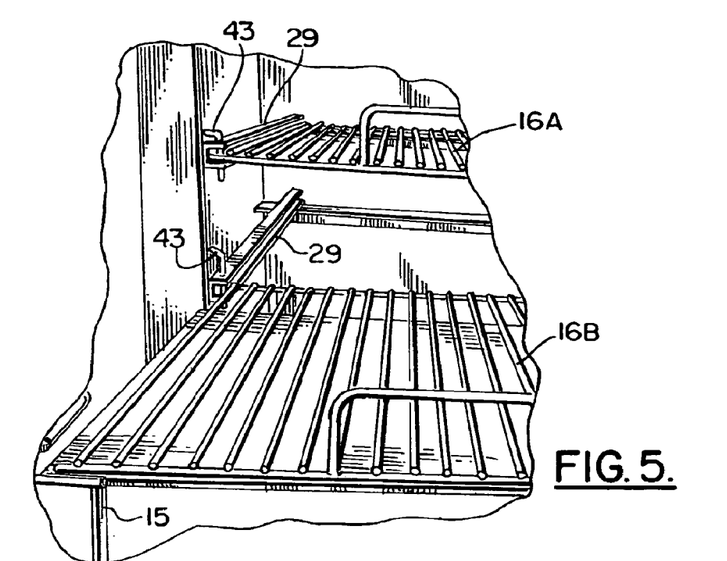
FIG. 5 is fragmentary view of the preferred embodiment of the apparatus of the present invention illustrating the oven shelves.

Cabinet 11 provides rear wall 17, side walls 18, 19, front wall 21 and bottom 20. Front wall 21 has an opening that is covered by door 14 when door 14 is closed (FIG. 1). Cabinet 11 provides an open top 22 having a plurality of perimeter beams 23 that are welded or otherwise connected to each respective wall 17, 18, 19, 21. The perimeter beams 23 can for example be angle shaped flanged beams.

Figure 6:
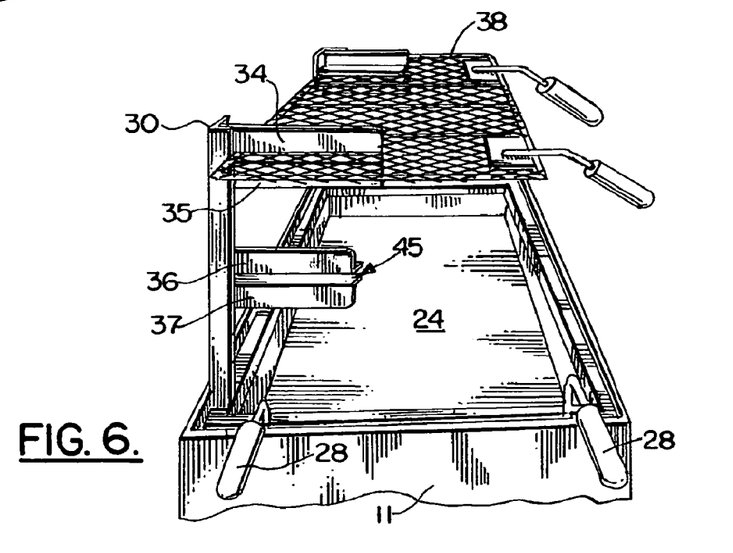
FIG. 6 is a partial side perspective view of the preferred embodiment of the apparatus of the present invention showing the firebox, grill support frame and grill in operating, cooking position.
Figure 7:
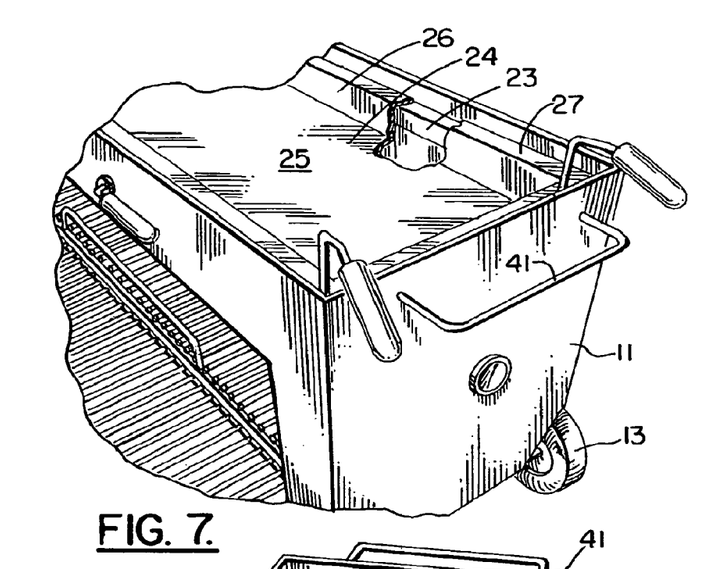
FIG. 7 is a partial perspective view of the preferred embodiment of the apparatus of the present invention.
Figure 8:
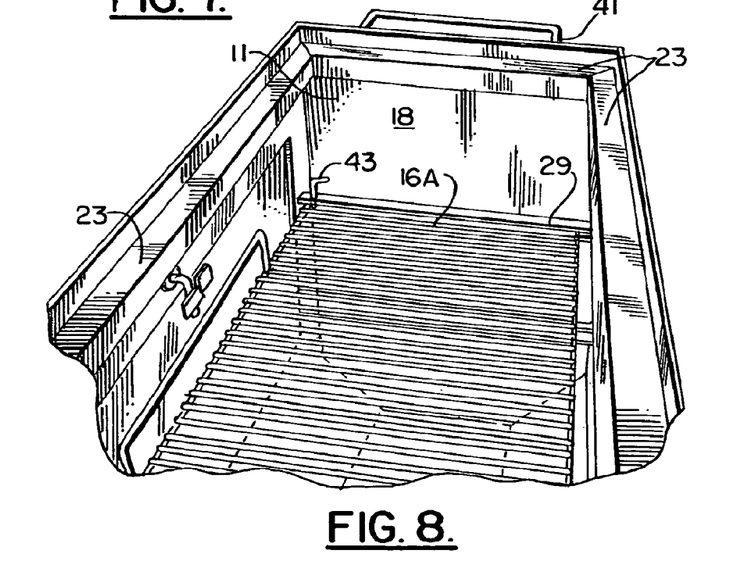
FIG. 8 is a partial perspective view of the preferred embodiment of the apparatus of the present invention showing the cabinet, cabinet interior, upper shelf and with the firebox and grill support frame removed.
Figure 10:
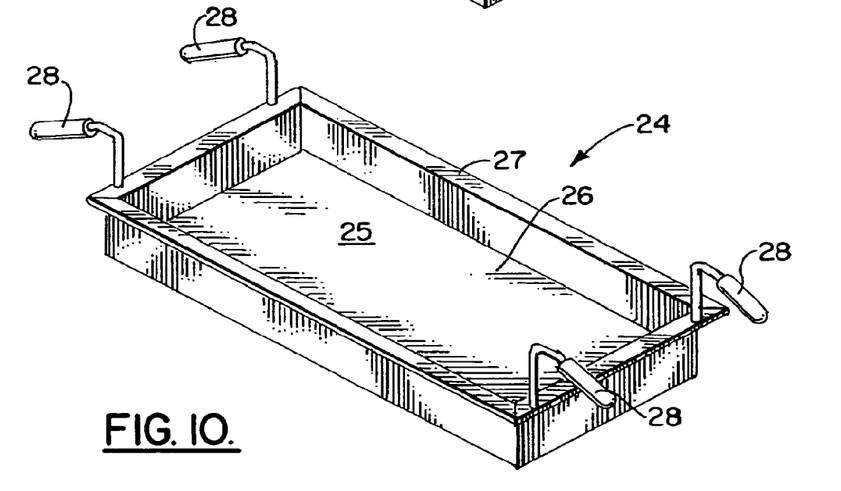
FIG. 10 is a partial perspective view of the preferred embodiment of the apparatus of the present invention showing the firebox.

The perimeter beams 23 support firebox 24 near the top of cabinet 11 when firebox 24 is placed in operating position of FIGS. 6 and 7. Firebox 24 has a bottom panel 25, a plurality of side panels 26, and a plurality of horizontally extending flanges 27. The flanges 27 rest upon perimeter beams 23 when firebox 24 is placed in an operating, cooking position at the upper end portion of cabinet 11. Firebox 24 is provided with handles 28 at its opposing end portions as shown in FIG. 10. The handles 28 enable the firebox 24 to be placed upon cabinet 11 or removed from cabinet 11. During cooking, a user places fuel such as charcoal, wood or the like in firebox 24 and on its bottom panel 25.

Shelf supports 29 slideably support the shelves 16A, 16B. A stop pin 43 can be provided for limiting the distance that shelves 16A, 16B can be moved outwardly such as to the position shown for shelf 16B in FIG. 2. Stop pin 43 can be removable so that a shelf 16A or 16B can be completely removed such as for cleaning or to increase space within interior 12.

Figure 9:
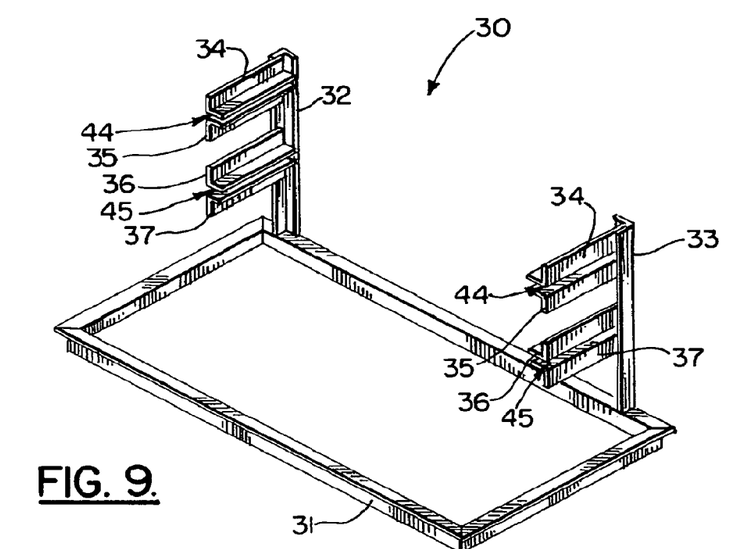
FIG. 9 is a fragmentary perspective view of the preferred embodiment of the apparatus of the present invention showing the grill support frame.

Grill support frame 30 can be placed upon the combination of cabinet 11 and firebox 24. Grill support frame 30 includes a rectangular base 31 that rests upon the combination of perimeter beams 23 and flanges 27 of firebox 24. The rectangular base 31 can be constructed of a plurality of angle shaped flanged beams as shown in FIG. 9.

Grill support frame 30 provides a pair of spaced apart columns 32, 33. Each column has a plurality of flanged supports 34, 35, 36, 37. The flanged supports preferably extend horizontally and are spaced apart providing a gap 44 between supports 34, 35 for receiving grill panel 38. Another gap 45 is between supports 36, 37.

Grill panel 38 can be comprised of a plurality of closely spaced apart bars that are welded together to provide a grilling surface for cooking food. The grill panel 38 can provide one or more handles 39 that enable it to be attached to or removed from a selected gap 44 or 45 between flanged supports 34, 35 or 36, 37.

An operating cooking position for grill panel 38 can be seen in FIGS. 1 and 6. When cooking items within cabinet 11 below firebox 24 and simultaneously food items upon grill panel 38, a user places the desired food item (or items) upon one or both of the shelves 16A, 16B and closes door 14. Door 14 is secured in a closed position with latch 40. For a very large food item, the upper shelf 16A can be removed. Door 14 can be opened and closed using handle 42.

For transporting the outdoor cooking apparatus 10 to the present invention from one location to another, handles 41 can be provided at each end portion so that a user can simply grip the handle 41 and push on the cart to transport it to the selected locale.

The following is a list of parts and materials suitable for use in the present invention.

PARTS LIST

| Part Number | Description |
| --- | --- |
| 10 | outdoor cooking apparatus |
| 11 | cabinet |
| 12 | interior |
| 13 | wheel |
| 14 | door |
| 15 | leg |
| 16A | shelve, upper |
| 16B | shelve, lower |
| 17 | rear wall |
| 18 | side wall |
| 19 | side wall |
| 20 | bottom |
| 21 | front wall |
| 22 | open top |
| 23 | perimeter beam |
| 24 | firebox |
| 25 | bottom panel |
| 26 | side panel |
| 27 | flange |
| 28 | handle |
| 29 | shelf support |
| 30 | grill support frame |
| 31 | rectangular base |
| 32 | column |
| 33 | column |
| 34 | flanged support |
| 35 | flanged support |
| 36 | flanged support |
| 37 | flanged support |
| 38 | grill panel |
| 39 | handle |
| 40 | latch |
| 41 | handle |
| 42 | handle |
| 43 | stop pin |
| 44 | gap |
| 45 | gap |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An outdoor oven apparatus comprising:
   a) a cabinet having front wall, rear wall, bottom and opposing side walls;
   b) the cabinet having an open top and an interior that extends below the open top;
   c) the cabinet having a load carrying portion defined by an upper portion of each wall;
   d) a firebox that is removably supported by the load carrying portion, wherein the firebox is positioned next to the cabinet upper end portion, the firebox having an open top surrounded by a peripheral portion that rests upon the load carrying portion and a concave receptacle space that extends below the peripheral portion for holding a plurality of solid fuel sources, the firebox having a firebox bottom panel positioned below the open top and side wall panels spanning between the bottom panel and peripheral portion;
   e) a grill panel supporting frame that attaches to the upper end portion of the cabinet and including a portion that extends above the cabinet and the firebox;
   f) one or more food receptive grill panels that removably attach to the grill panel supporting frame;
   g) wherein the cabinet has an oven section below the bottom panel of the firebox and an oven door in the front wall that is positioned below the bottom panel of the firebox and that moves between open and closed positions;
   h) the grill panel and oven section enabling one or more food items to be cooked simultaneously on the grill panel and in the oven section, said food items being heated simultaneously by fuel that is burning in the firebox above the firebox bottom panel;
   i) wherein the cabinet surrounds the firebox bottom panel and side wall panels so that heat transfer is from the firebox bottom panel and side wall panels to the oven section; and
   j) wherein the fire box and oven section are sized such that the oven does cook food using the firebox as the only source of heat.

2. The outdoor oven apparatus of claim 1 wherein there are one or more shelves removably supported by the cabinet in the oven section.

3. The outdoor oven apparatus of claim 1 wherein the door has one or more legs that support the door when it is in the open position.

4. The outdoor oven apparatus of claim 1 wherein the grill panel supporting frame includes a rectangular base that rests upon the cabinet.

5. The outdoor oven apparatus of claim 1 wherein the grill panel supporting frame includes one or more columns that extend upwardly from the cabinet while cooking.

6. The outdoor oven apparatus of claim 5 wherein there are a pair of columns, each having holders for engaging the grill panel.

7. The outdoor oven apparatus of claim 6 wherein there are multiple holders on the columns and multiple grates supported by the columns and holders.

8. The outdoor oven apparatus of claim 1 wherein the firebox is comprised of a plurality of beams that engage the upper end portion of the cabinet and a plurality of side panels that extend downwardly from the beams and a bottom panel for holding solid fuel sources, wherein the side panels surround the receptacle space.

9. An outdoor oven apparatus comprising:
  a) a cabinet having a front wall, a rear wall, a bottom and opposing side walls, each wall having an upper portion;
  b) the cabinet having an open top and a door that is mounted on the front wall to move between open and closed positions;
  c) the cabinet having a load carrying portion next to the upper portions of the walls;
  d) a firebox that is removably supported by the load carrying portion, wherein the firebox has a peripheral frame positioned next to the cabinet upper end portion, the firebox having an open top surrounded by the peripheral frame and a downwardly extending receptacle space, a firebox bottom panel positioned below the peripheral frame for holding a plurality of solid fuel sources, and a plurality of fire box side wall panels that span between the bottom panel and the peripheral frame;
  e) a grill panel supporting frame that attaches to the upper end portion of the cabinet and including a portion that extends above the cabinet and firebox;
  f) one or more food receptive grill panels that removably attach to the grill panel supporting frame;
  g) wherein the cabinet has an oven section below the firebox bottom panel and an oven door in the front wall that extends from a position below the firebox bottom panel to a position next to the cabinet bottom, and wherein the door moves between open and closed positions;
  h) the grill panel and oven section enabling simultaneous cooking of one or more food items on the grill panel and one or more food items in the oven section below the firebox, said food items being simultaneously heated by fuel that is burning in the firebox, and wherein heat exiting the open top of the firebox heats food items on the grill panel;
  i) wherein the cabinet surrounds the firebox bottom panel and side wall panels so that heat transfer is from the firebox bottom panel and side wall panels to the oven section; and
  j) wherein the fire box and oven section are sized such that the oven does cook food using the firebox as the only source of heat.

10. The outdoor oven apparatus of claim 9 wherein there are one or more shelves removably supported by the cabinet in the oven section.

11. The outdoor oven apparatus of claim 9 wherein the door has one or more legs that support the door when it is in the open position.

12. The outdoor oven apparatus of claim 9 wherein the grill panel supporting frame includes a rectangular base that rests upon the cabinet.

13. The outdoor oven apparatus of claim 9 wherein the grill panel supporting frame includes one or more columns that extend upwardly from the cabinet while cooking.

14. The outdoor oven apparatus of claim 13 wherein there are a pair of columns, each having holders for engaging the grill panel.

15. The outdoor oven apparatus of claim 14 wherein there are multiple holders on the columns and multiple grates supported by the columns and holders.

16. The outdoor oven apparatus of claim 9 wherein the firebox is comprised of a plurality of beams that engage the upper end portion of the cabinet and a plurality of side panels that extend downwardly from the beams and a bottom panel for holding solid fuel sources, wherein the side panels surround the receptacle space.

* * * * *